United States Patent [19]

Albanese et al.

[11] Patent Number: 4,704,613

[45] Date of Patent: Nov. 3, 1987

[54] RADAR RANGING SYSTEM

[75] Inventors: Damian F. Albanese, Chatsworth; Kanji F. Sayano, Sepulveda, both of Calif.

[73] Assignee: ITT Gilfillan A Division of ITT Corporation, Van Nuys, Calif.

[21] Appl. No.: 660,186

[22] Filed: Oct. 12, 1984

[51] Int. Cl.[4] .................................................. G01S 3/02

[52] U.S. Cl. ..................................... 342/458; 364/458

[58] Field of Search ................ 343/458, 461, 463–465, 343/450, 445, 424; 364/458

[56] References Cited

U.S. PATENT DOCUMENTS 4,422,076 12/1983 Tricoles et al. ..................... 343/458

*Primary Examiner*—Theodore M. Blum
*Assistant Examiner*—Gregory C. Issing
*Attorney, Agent, or Firm*—Robert A. Walsh; Mary C. Werner

[57] ABSTRACT

A system for determining the range R of a stationary emitter on the ground from an airborne bistatic radar as a function of velocity V, direction $\beta$, antenna spacing d, wavelength $\lambda$ and rate of change of phase with respect to time $\dot{\theta}$ is discussed herein:

$$R = \frac{V}{\dot{\theta}} \times \frac{\pi d}{\lambda} \times \sin 2\beta$$

1 Claim, 8 Drawing Figures

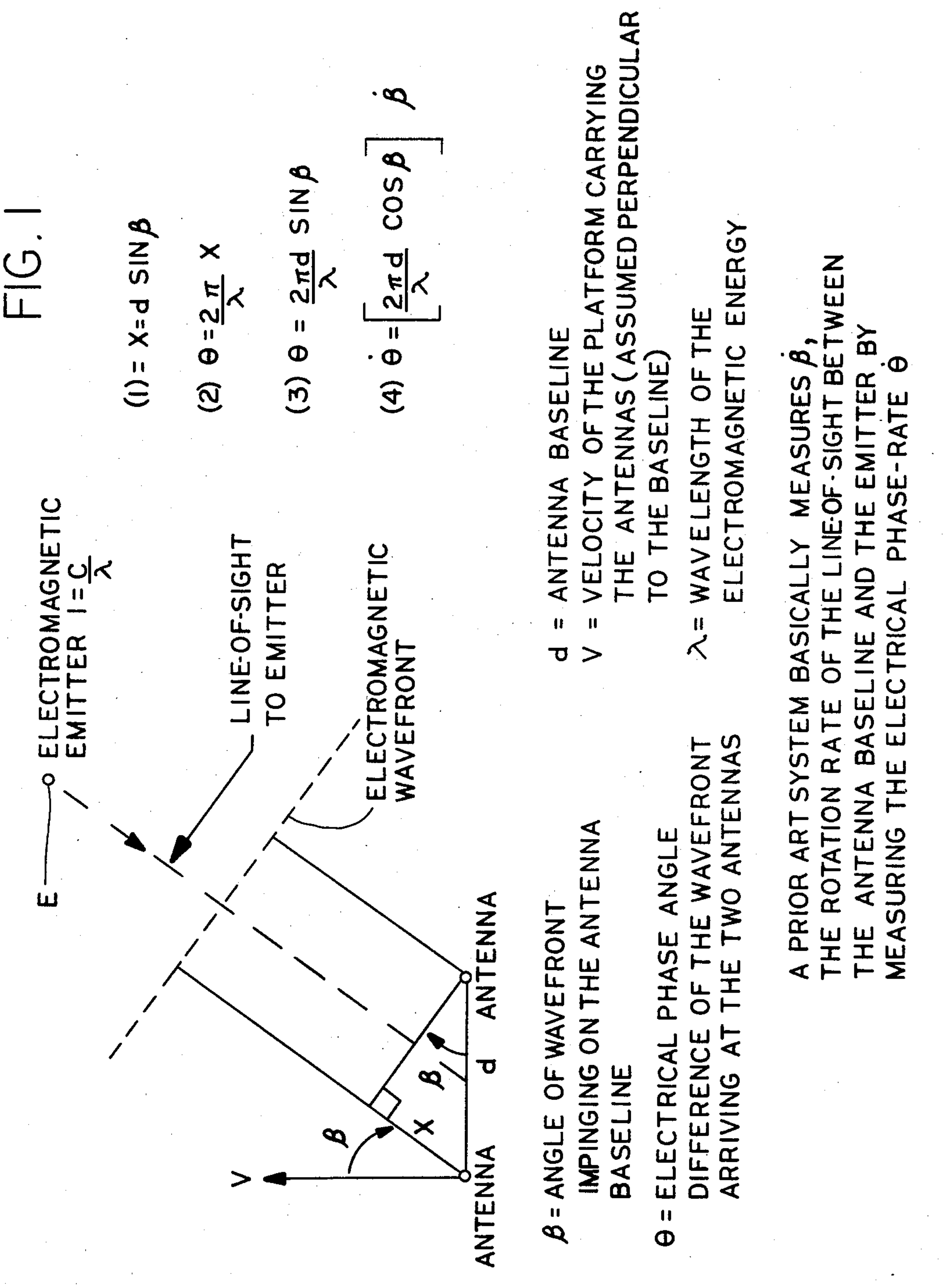

FIG. 1
E
ELECTROMAGNETIC EMITTER $I=\frac{C}{\lambda}$
LINE-OF-SIGHT TO EMITTER
ELECTROMAGNETIC WAVEFRONT
V
β
X
β
d
ANTENNA
ANTENNA
(1) = $X = d \sin\beta$
(2) $\theta = \frac{2\pi}{\lambda} X$
(3) $\theta = \frac{2\pi d}{\lambda} \sin\beta$
(4) $\dot{\theta} = \left[\frac{2\pi d}{\lambda} \cos\beta\right] \dot{\beta}$
β = ANGLE OF WAVEFRONT IMPINGING ON THE ANTENNA BASELINE
θ = ELECTRICAL PHASE ANGLE DIFFERENCE OF THE WAVEFRONT ARRIVING AT THE TWO ANTENNAS
d = ANTENNA BASELINE
V = VELOCITY OF THE PLATFORM CARRYING THE ANTENNAS (ASSUMED PERPENDICULAR TO THE BASELINE)
λ = WAVELENGTH OF THE ELECTROMAGNETIC ENERGY
A PRIOR ART SYSTEM BASICALLY MEASURES $\dot{\beta}$, THE ROTATION RATE OF THE LINE-OF-SIGHT BETWEEN THE ANTENNA BASELINE AND THE EMITTER BY MEASURING THE ELECTRICAL PHASE-RATE $\dot{\theta}$

PASSIVE RANGING GEOMETRY

INTERFEROMETER GEOMETRY

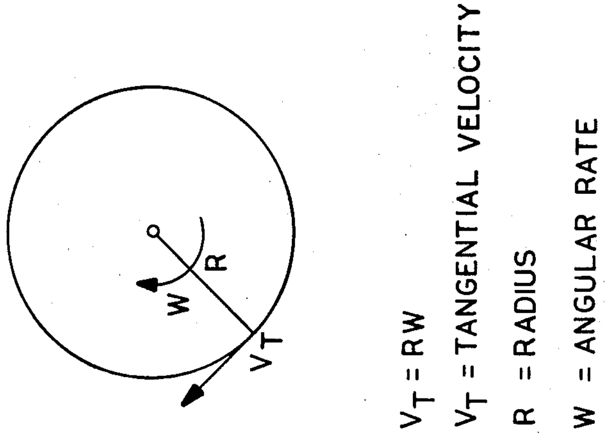

FIG. 2

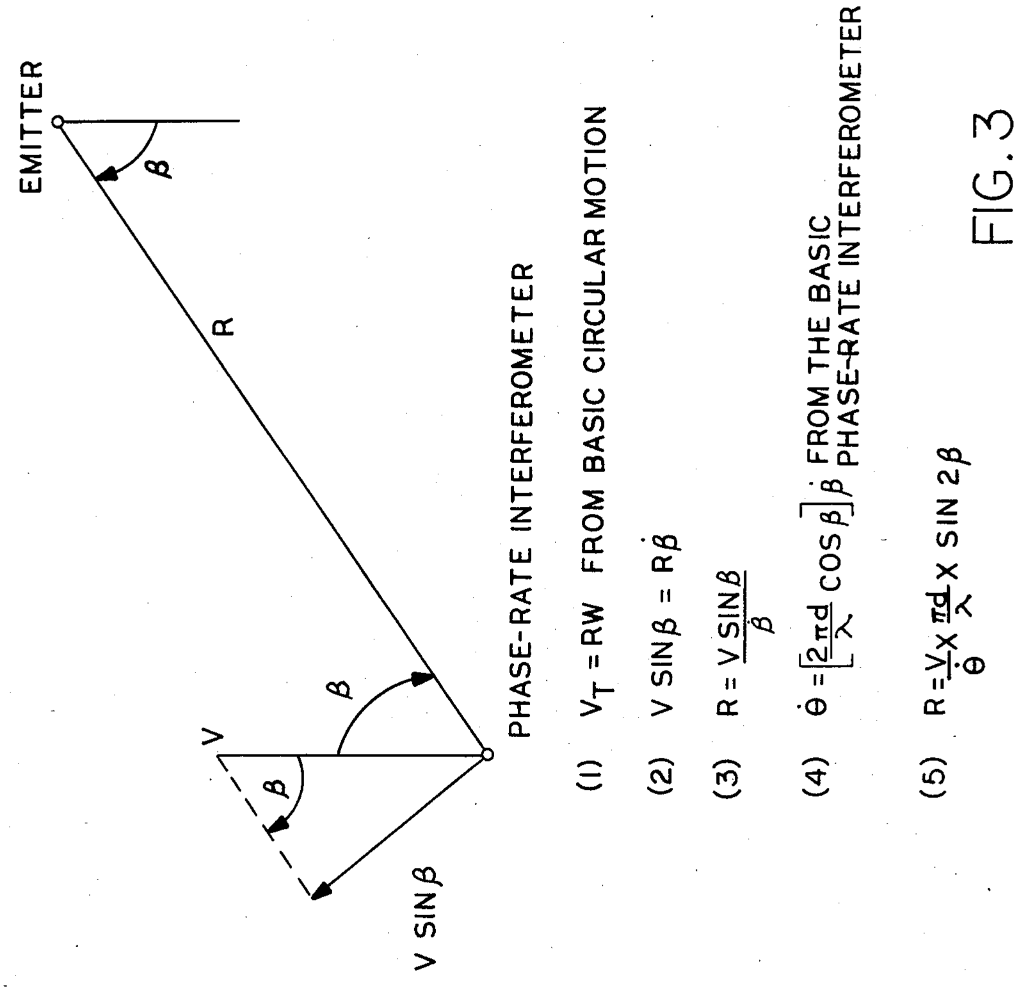

FIG. 3

PHASE-RATE INTERFEROMETER (1) $V_T = RW$ FROM BASIC CIRCULAR MOTION (2) $V \sin\beta = R\dot\beta$ (3) $R = \dfrac{V \sin\beta}{\dot\beta}$ (4) $\dot\theta = \left[\dfrac{2\pi d}{\lambda} \cos\beta\right]\dot\beta$ FROM THE BASIC PHASE-RATE INTERFEROMETER (5) $R = \dfrac{V}{\dot\theta} \times \dfrac{\pi d}{\lambda} \times \sin 2\beta$ $V_T = RW$
$V_T$ = TANGENTIAL VELOCITY
$R$ = RADIUS
$W$ = ANGULAR RATE

RADAR RANGING SYSTEM

BACKGROUND OF THE INVENTION

This invention relates to radars, and more particularly to a phase-rate interferometer passive ranging system.

PRIOR ART STATEMENT

Phase-rate interferometer systems are disclosed in Albanese et al. U.S. Pat. No. 3,090,957 issued May 21, 1963, and Sayano et al. U.S. Pat. No. 3,789,410 issued Jan. 29, 1974. However, neither of these patents discloses means to deliver range as a function of velocity, phase-rate and/or direction.

SUMMARY OF THE INVENTION

In accordance with the system of the present invention, the above-described and other disadvantages of the prior art are overcome by providing a passive phase-rate interferometer ranging system.

BRIEF DESCRIPTION OF THE DRAWINGS

In the accompanying drawings which illustrate an exemplary embodiment of the present invention:

FIG. 1 is a diagram illustrating how, in the prior art, a variable $\dot{\beta}$ is derived from a phase-rate $\dot{\theta}$;

FIG. 2 is a diagram illustrating tangential velocity $V_T$ as a function of radius R and angular velocity W;

FIG. 3 is a diagram illustrating that radar range R is a function of velocity V, antenna spacing d, angle $\beta$, phase-rate $\dot{\theta}$ and wavelength $\lambda$;

DESCRIPTION OF THE PREFERRED EMBODIMENT

Figure 1A:
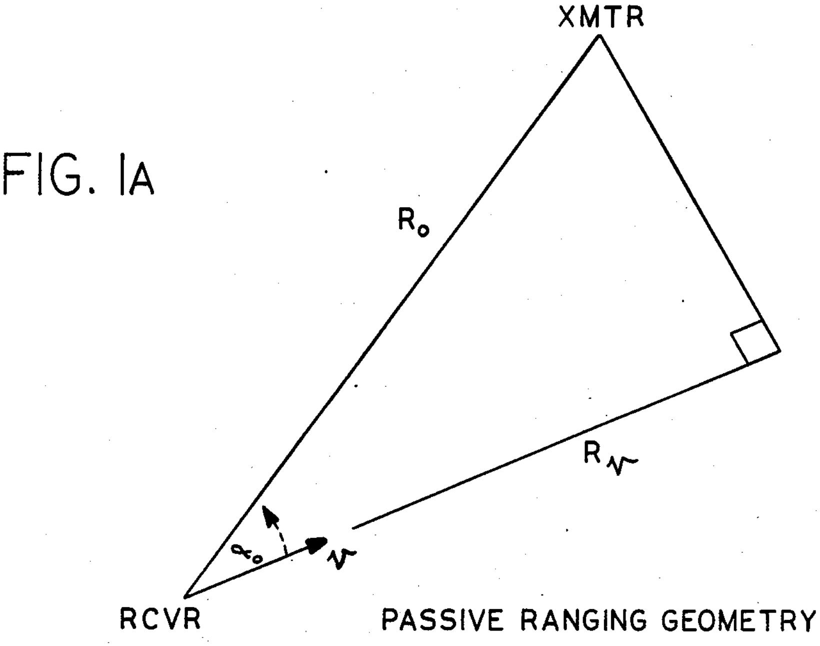
FIG. 1A is a diagram for use with an Appendix I.

In passive bistatic radar operation, knowledge of a baseline range R (FIG. 1), the distance between a radar emitter E and a bistatic receiver, would be required in order to properly initiate antenna search and to make necessary bistatic range measurement corrections. The present invention also has utility in pulse-chasing and passive ranging for tactical weapon delivery.

Where the position of both the emitter and bistatic receiver are known (even if one or both are moving), the baseline range R is easily calculated.

The cases of most interest are where the bistatic receiver is aboard a moving platform, such as an aircraft, and the emitter is (1) a stationary ground emitter whose location is not known, and (2) a moving airborne emitter whose location is not known.

A well known method of locating a stationary ground emitter from an aircraft is to make several angle direction finding (DF) cuts from the moving aircraft to the emitter and locate the emitter at the intersection of the DF cuts. This approach generally takes too long and may require special aircraft maneuvers, both of which are undesirable. Also, if both the emitter and the bistatic receiver are moving, the DF cut approach cannot be used.

To solve the problem where both emitter and bistatic receiver are aboard moving aircraft, an LRPLS (Long Range Position Location System) was invented. For the program where the LRPLS system is not available and may not be applicable because of its long baseline requirements, a new bistatic triangulation ranging approach was conceived wherein an additional angle measurement was made at the bistatic receiver.

The LRPLS system and the bistatic triangulation approach both require that the emitter have a constantly rotating scanning antenna beam. That is, if the radar emitter antenna scan is not constant, neither system will work. The present invention overcomes this problem as indicated in the following.

Interferometer techniques have existed in the prior art (FIG. 1) for making precision angle measurements. In accordance with the present invention, a system is provided that makes use of phase-rate information. This system makes use of the velocity of a moving platform with respect to an emitter to derive the necessary information. Use is made of the velocity of the bistatic receiver aircraft. This can be used to solve for the bistatic baseline distance R. The LRPLS and the triangulation method do not make use of aircraft velocity data.

A conventional phase-rate interferometer system is referred to in FIG. 1. Basically, the system measures $\dot{\beta}$, the rate of change with respect to time of the line-of-sight angle $\beta$ between the antenna baseline d and the line-of-sight through the emitter E. The phase-rate $\dot{\theta}$ is the rate of change of phase angle difference arriving at the two antennas separated by distance d. It is $\dot{\theta}$ from which $\dot{\beta}$ can be determined.

There is a derivation shown in FIG. 1 where equation (3) is the normal stationary interferometer equation which equates the electrical phase angle $\theta$ and $\beta$ the line-of-sight angle to the emitter (or the angle the wavefront makes with the antenna baseline).

If the baseline moves with a velocity V, then the line-of-sight will rotate and $\beta$ will change with them. The emitter E, antennas, and the velocity vector are assumed to be in the same plane. By differentiating equation (3) with respect to time, the following is obtained:

$$\dot{\theta} = \left[ \frac{2\pi}{\lambda} \cos\beta \right] \dot{\beta} \quad \text{(A)}$$

where $\pi$=3.1416, and $\lambda$=wavelength.

This relates the electrical phase-rate $\dot{\theta}$ and the physical line-of-sight rotation rate $\dot{\beta}$.

An equation relating range R (FIG. 3) or $R_o$ to the emitter E is rigorously derived in Appendix I hereinafter and is summarized in FIGS. 2 and 3 as follows:

$$R = \frac{V}{\dot{\theta}} \times \frac{\pi d}{\lambda} \times \sin 2\beta \quad \text{(B)}$$

where

R=range between the emitter and the antenna system

V=antenna platform velocity d=antenna baseline $\beta$=line-of-sight angle from antenna to emitter $\theta$=electrical phase-rate of change at the antennas $\lambda$ = the emitter wavelength Since V, d, and $\lambda$ are known, and $\beta$ and $\dot{\theta}$ can be measured, R can be calculated and obtained passively.

Equation (4) in FIG. 1 is solvable for $\dot{\beta}$ because d and $\lambda$ are known, and $\beta$ may be derived by conventional means.

Figure 4:
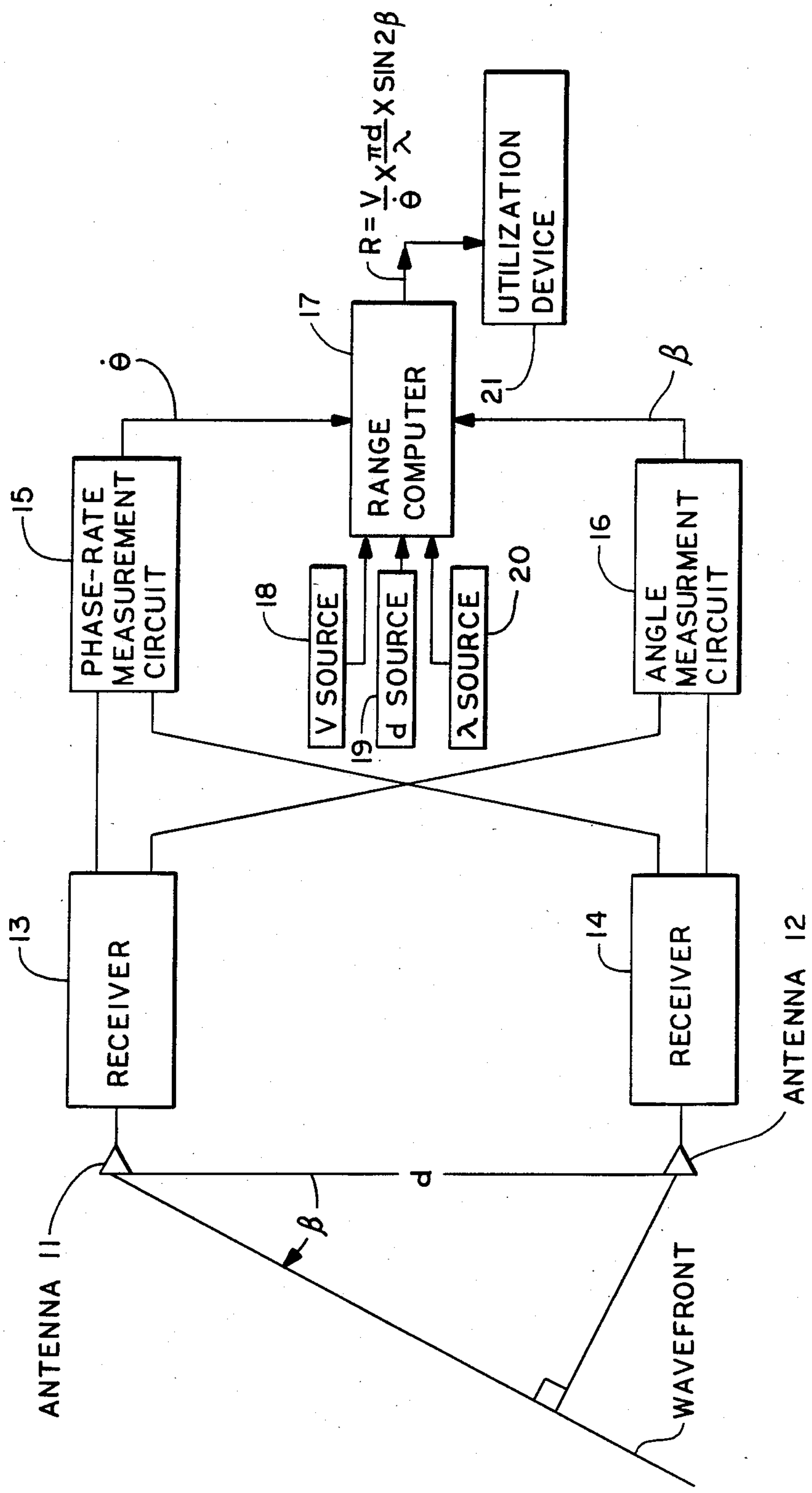
FIG. 4 is a block diagram of the system of the present invention.

The system of the present invention is shown at 10 in FIG. 4 including antennas 11 and 12 spaced apart distance d. Receivers 13 and 14 are connected from antennas 11 and 12, respectively. The outputs of both receivers 13 and 14 are connected both to a phase-rate measurement circuit 15 and to an angle measurement circuit 16.

A range computer 17 is also provided. A V source 18, a d source 19, and a $\lambda$ source 20 are connected to provide input signals to range computer 17 proportional to V, d and $\lambda$, respectively.

Circuit 15 provides a signal to range computer 17 proportional to $\dot{\theta}$. Circuit 16 provides a signal to range computer 17 proportional to $\beta$.

Circuits 15 and 16 may be conventional, if desired.

Range computer 17 has an output connected to a utilization device 21 to deliver a signal thereto proportional to R as defined in equation (B).

Range computer 17 may be analog or digital. It may also be mechanized in any one of several ways using multipliers or dividers and a sine function generator or ROM (read only memory).

Figure 5:
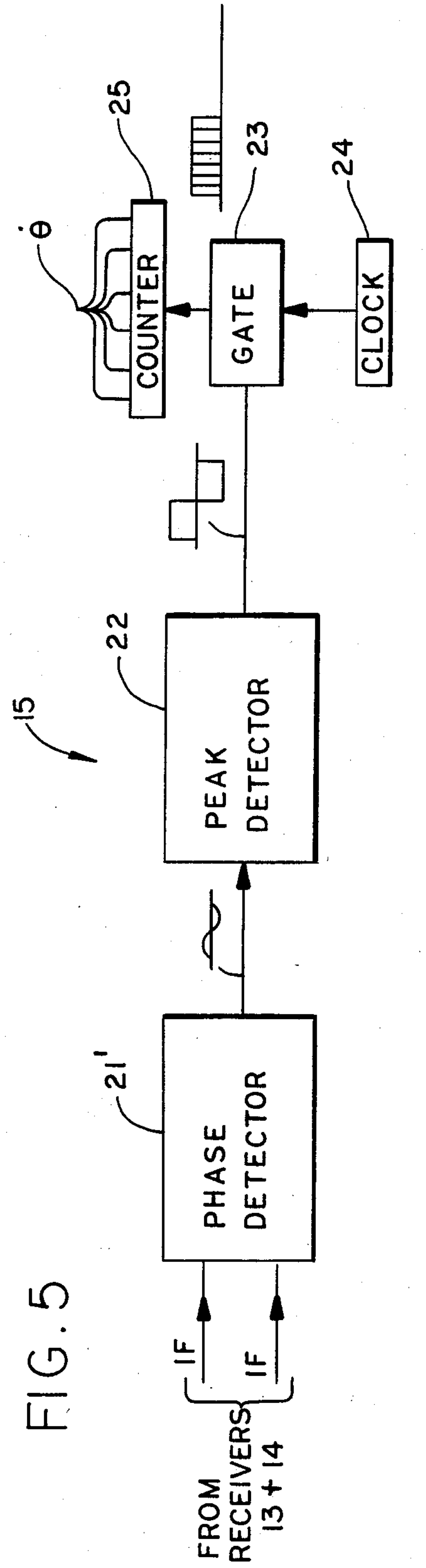
FIG. 5 is a more detailed block diagram of a phase-rate measurement circuit shown in FIG. 4.

In FIG. 5, a phase detector 21', a peak detector 22 and a gate 23 are connected in succession from receivers 13 and 14.

Gate 23 passes the output of a clock 24 to a counter 25, the output of which is $\dot{\theta}$.

Figure 6:
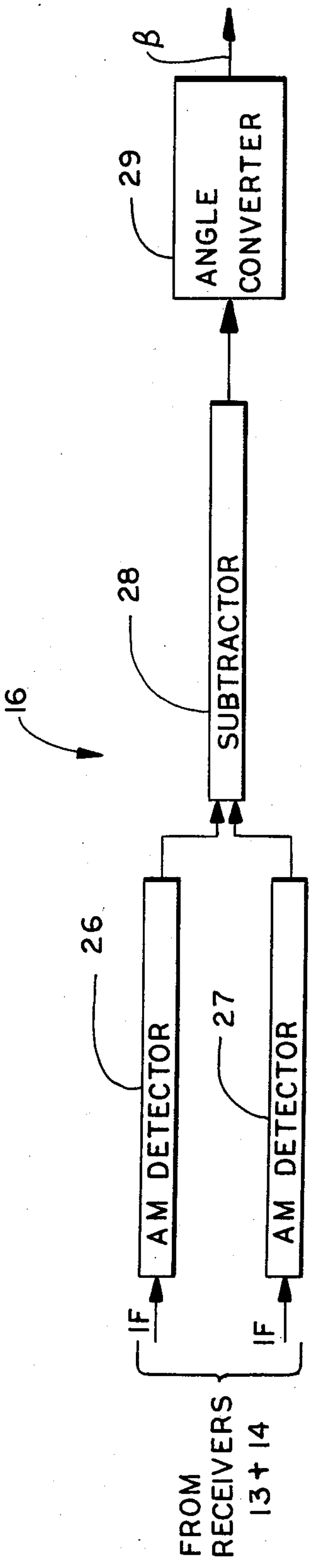
FIG. 6 is a more detailed block diagram of an angle measurement circuit shown in FIG. 4.

In FIG. 6, the inputs of amplitude detectors 26 and 27 are connected from receivers 13 and 14 through a subtractor 28 to an angle converter 29.

The circuits of FIGS. 5 and 6 may be conventional.

Circuit 16 in FIG. 4 may be a circuit used for a conventional phase-rate interferometer system, although any other on-board DF system may be used.

Utilization device 21 in FIG. 4 may be a range indicator, a fire control system or otherwise.

APPENDIX 1

THE PASSIVE RANGING EQUATION

PASSIVE RANGING TO A GROUND-BASED TRANSMITTER SOURCE CAN BE ACHIEVED FROM AN AIRBORNE PLATFORM MOVING AT A VELOCITY $v$. THE GEOMETRY FOR THIS CASE IS SHOWN IN FIG. 1A, AND THE RANGING EQUATION IS DERIVED AS FOLLOWS, FROM FIG. 1A, IT CAN BE SEEN THAT THE COMPONENT OF $R_o$ IN THE DIRECTION OF $v$ IS $$R_v = R_o \text{COS}\alpha_o \quad (1)$$

DIFFERENTIATING WITH RESPECT TO TIME $$\frac{dR_v}{dt} = R_o(-\text{SIN}\alpha_o)\frac{d\alpha_o}{dt} + (\text{COS}\alpha_o)\frac{dR_o}{dt} \quad (2)$$

$$\text{BUT } \frac{dR_v}{dt} = -v \text{ AND } \frac{dR_o}{dt} = -v\text{COS}\alpha_o$$

SUBSTITUTING INTO EQUATION (2), $$-v = -R_o\text{SIN}\alpha_o\frac{d\alpha_o}{dt} + (\text{COS}\alpha_o)(-v\text{COS}\alpha_o)$$

$$\text{OR } v = R_o\text{SIN}\alpha_o\frac{d\alpha_o}{dt} + v\text{COS}^2\alpha_o$$

REARRANGING,

APPENDIX 1-continued

THE PASSIVE RANGING EQUATION $$v - v\text{COS}^2\alpha_o = +R_o\text{SIN}\alpha_o\frac{d\alpha_o}{dt}$$

$$\text{OR } v(1 - \text{COS}^2\alpha_o) = +R_o\text{SIN}\alpha_o\frac{d\alpha_o}{dt}$$

$$\text{AND } v\text{SIN}^2\alpha_o = R_o\text{SIN}\alpha_o\frac{d\alpha_o}{dt}$$

$$\text{SOLVING FOR } R_o,\ R_o = v\text{SIN}\alpha_o \div \frac{d\alpha_o}{dt} \quad (3)$$

Figure 2A:
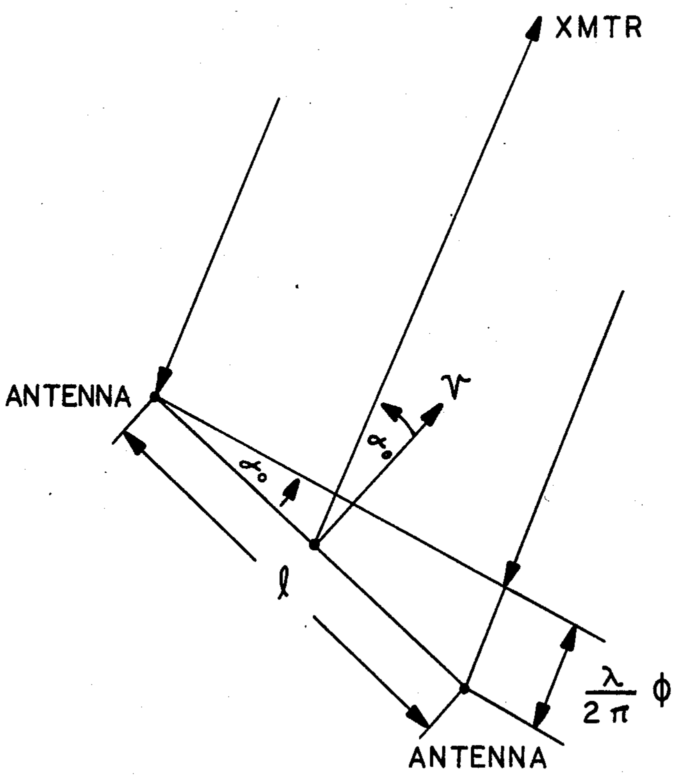
FIG. 2A is a diagram also for use with Appendix I.

THE PARAMETER $\frac{d\alpha_o}{dt}$ IS THE RATE OF CHANGE OF THE AZIMUTH ANGLE TO THE TRANSMITTER AS THE AIRBORNE RECEIVER PLATFORM MOVES AT A VELOCITY $v$. THE ANGLE RATE OF CHANGE CAN BE RELATED TO THE PHASE-RATE OF CHANGE OF THE RADIO FREQUENCY (RF) SIGNAL BY USING AN INTERFEROMETER WITH TWO ELEMENTS. FIG. 2A ILLUSTRATES THE INTERFEROMETER CONFIGURATION WITH ITS ANTENNAS SEPARATED BY DISTANCE l. FROM THIS FIGURE, IT CAN BE SEEN THAT $$\frac{\lambda\phi}{2\pi} = l\text{SIN}\alpha_o \quad (4)$$

DIFFERENTIATING WITH RESPECT TO TIME t, $$\frac{\lambda}{2\pi}\frac{d\phi}{dt} = l\text{COS}\alpha_o\frac{d\alpha_o}{dt}$$

SOLVING FOR $\frac{d\alpha_o}{dt}$, $$\frac{d\alpha_o}{dt} = \frac{\lambda}{2\pi l\text{COS}\alpha_o}\cdot\frac{d\phi}{dt} \quad (5)$$

SUBSTITUTING INTO EQUATION (3), $$R_o = v\text{SIN}\alpha_o \div \frac{\lambda}{2\pi l\text{COS}\alpha_o}\cdot\frac{d\phi}{dt}$$

$$= v\left(\frac{2\pi l}{\lambda}\right)\cdot\text{SIN}\alpha_o\text{COS}\alpha_o \div \frac{d\phi}{dt}$$

$$= v\left(\frac{\pi l}{\lambda}\right)\text{SIN}2\alpha_o \div \frac{d\phi}{dt}$$

LET $\frac{d\phi}{dt} = \dot{\phi}$, THEN $$\boxed{R_o = v\left(\frac{\pi l}{\lambda}\right)\text{SIN}2\alpha_o \div \dot{\phi}} \quad (6)$$

What is claimed is:

1. A method for determining the range of a moving radar receiver from a radar emitter, said receiver having first and second antennas separated by a fixed distance along an antenna baseline and said method including the steps of:
   (a) ascertaining the velocity of the receiver;
   (b) determining the angle between the antenna baseline and the line-of-sight to the emitter;
   (c) ascertaining the rate of change of the difference in the phase angle of the signals arriving at said first and second antennas from said radar emitter;

(d) multiplying the velocity of the receiver by the constant pi, the distance between the antennas, and the sine of twice the angle between the antenna baseline and the line-of-sight to the emitter to provide a first product;

(e) multiplying the rate of change of the difference in the phase angle of the signals arriving at said first and second antennas from said radar emitter by the wavelength of the received signal to provide a second product; and (f) dividing the first product by the second product to determine the range of the radar receiver from the radar emitter.

* * * * *